United States Patent [19] [11] 4,040,679
Teramachi [45] Aug. 9, 1977

[54] SLIDE WAY BEARING

[76] Inventor: Hiroshi Teramachi, 2-34-8, Higashi-tamagawa, Setagaya, Tokyo, Japan

[21] Appl. No.: 661,329

[22] Filed: Feb. 25, 1976

[30] Foreign Application Priority Data

Feb. 28, 1975 Japan .............................. 50-27675[U]
Feb. 28, 1975 Japan .............................. 50-27676[U]

[51] Int. Cl.² .............................................. F16C 29/04
[52] U.S. Cl. .................................................... 308/6 C
[58] Field of Search ............... 308/6 R, 6 C, 3 A, 3 R

[56] References Cited

U.S. PATENT DOCUMENTS 3,272,569 9/1966 Mergen ........................... 308/6 C X
3,938,854 2/1976 Teramachi ........................... 308/6 R Primary Examiner—Joseph F. Peters, Jr.
Assistant Examiner—Gene A. Church
Attorney, Agent, or Firm—McGlew and Tuttle

[57] ABSTRACT

An improved slide way assembly according to the present invention comprises a slide saddle member being formed by integrating an outer sleeve part of a ball bearing assembly with a saddle part, an elongated bar being formed by integrating a track shaft part with a bed part, plural balls and a ball retainer. Ball raceways are formed by cooperating grooves in the inner surface of the outer sleeve part and in the outer surface of the ball retainer, the ball retainer being telescoped in the outer sleeve part and embracing that portion of the track shaft part projecting upwardly above the bed part. Further, if desired, the slide saddle member is provided on the saddle part thereof with a velleville spring which is served to absorb and relieve an impact load on the saddle member.

9 Claims, 10 Drawing Figures

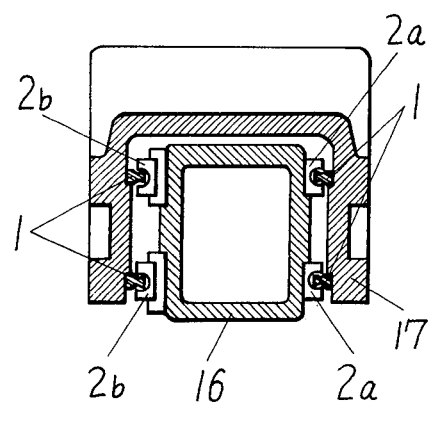
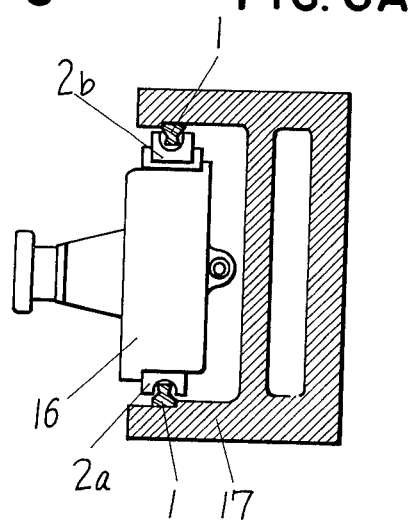
FIG. 6 FIG. 6A
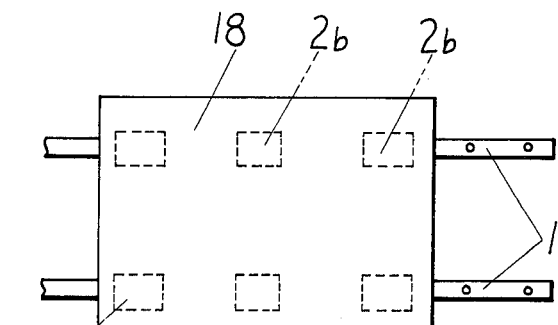
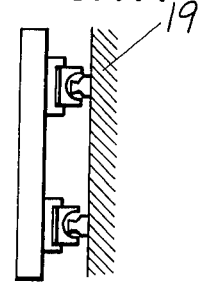
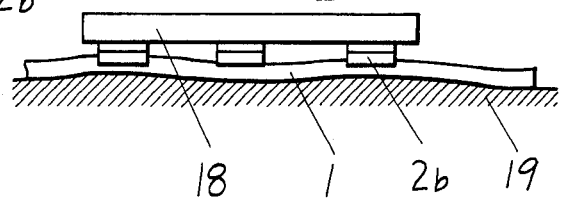
FIG. 7 FIG. 7A FIG. 7B

SLIDE WAY BEARING

BACKGROUND OF THE INVENTION

1. Field of the Invention

The present invention relates in general to a slide way bearing, and, in particular, to the improved slide way bearing capable of bearing a heavy load imposed on a slide saddle member, mounted on a bar, from all direction, and capable of effecting an accurate movement of the slide saddle member.

2. Description of the Prior Art

There are known slide way bearings capable of bearing a load. In particular, the U.S. Pat. No. 3,897,982 according to my invention discloses a slide way bearing which comprises a saddle member, a ball bearing assembly, a track shaft and a bed. This slide way bearing is capable of bearing a load imposed on an outer sleeve member of the bearing, mounted on a track shaft, from all directions. But, an outer sleeve member of such bearing is separately formed from the saddle member and is closely fitted to the C-shaped inner surface of the saddle member in such a manner as a key. Accordingly, certain errors of fitting between the saddle member and the outer sleeve member is unavoidable. Therefore, an accuracy for sliding movement of the saddle member is not able to increase beyond a certain degree of accuracy, and the outer sleeve member, as the case may be, is deformed by a heavy load or an impact load on the saddle member.

SUMMARY OF THE INVENTION

In accordance with the present invention, the improved slide way bearing comprises a slide saddle member being formed by integrating an outer sleeve part of a ball bearing assembly with a saddle part, an elongated bar being formed by integrating a track shaft part with a bed part, plural balls and a ball retainer. The slide saddle member has a circularly cylindrical recess with a bottom opening for receiving the elongated bar therein, so as to form the thick outer sleeve part. The slide saddle member is further machined on the inside surface of its cylindrical recess to form parallel grooves which extend substantially the entire length of the sleeve part and forms raceways for loaded balls in cooperation with the ball retainer. The elongated bar is provided with two opposite sides each having a pair of circumferentially spaced apart cylindrical raceway grooves for loaded balls arranged on respective arcuate surfaces or shoulder portion, thereby forming a track shaft part. In addition, the elongated bar is longitudinally provided with two grooves on respective sides of the bar located below the shoulder portion in order to form stop recesses for corresponding bottom edges of the outer sleeve parts. Below the two grooves, there is formed a bed part. The plural balls are carried by the ball retainer which has an uniform thickness and has slot openings for loaded balls. Further, if desired, the slide saddle member is provided with a cradle on the saddle part thereof, including a velleville spring between the saddle part and the cradle.

Accordingly, it is an object of the present invention to provide a slide way bearing capable of bearing a heavy load imposed on the slide saddle member and effecting an accurate movement of the slide saddle member.

It is another object of the present invention to provide a slide way bearing which has the slide saddle member including a cradle which is adjustable to locate the upper surface thereof to the very high degree of horizontal positioning accuracy.

The invention itself as well as advantageous features thereof will become apparent when reference is given to the following detailed description of preferred embodiments thereof, the detailed description referring to the appended drawings.

BRIEF DESCRIPTION OF THE DRAWINGS

In the drawings:

FIGS. 6 and 6A are explanatory drawings showing a typical application of the slide way bearng according to the present invention to a ram driving mechanism; and FIGS. 7, 7A and 7B are explanatary drawings showing another typical application of the slide way bearing according to the present invention to a large slide rest.

DESCRIPTION OF THE PREFERRED EMBODIMENTS

Figure 1:
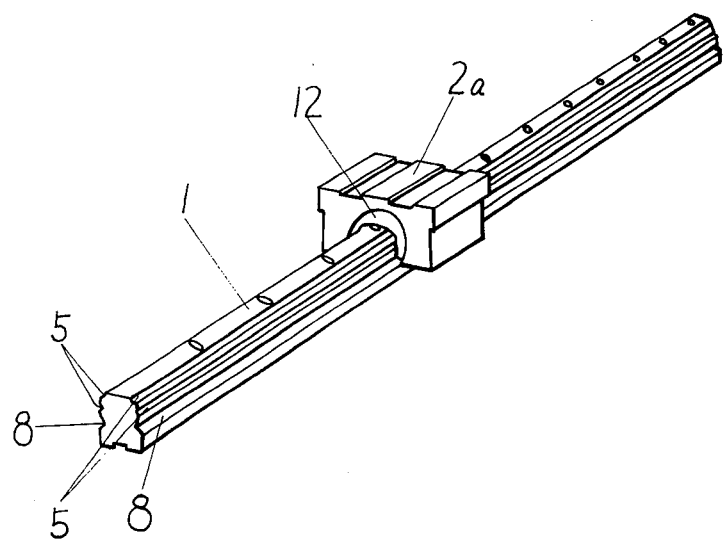
FIG. 1 is a perspective view of one embodiment of a slide way bearing according to the present invention.
Figure 2:
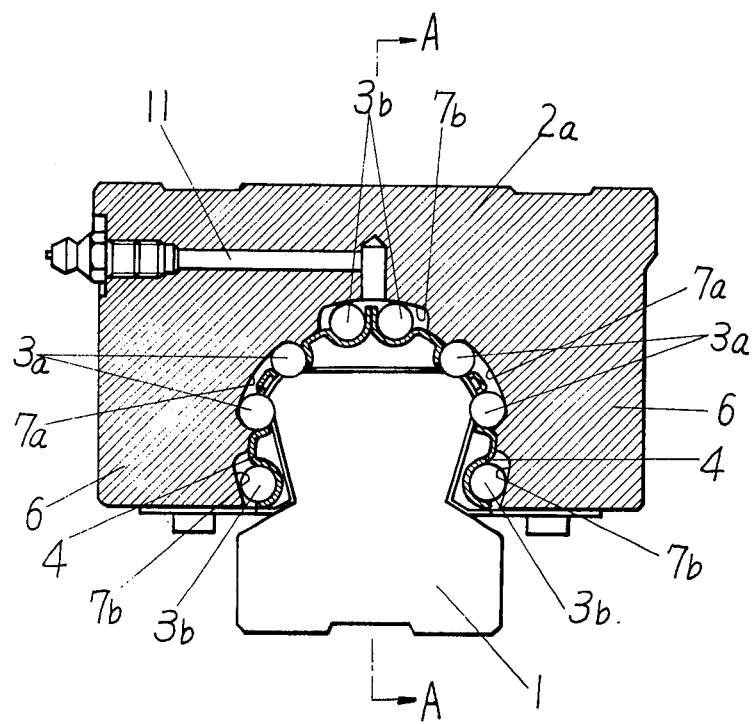
FIG. 2 is a transverse section of the slide way bearing of FIG. 1.
Figure 3:
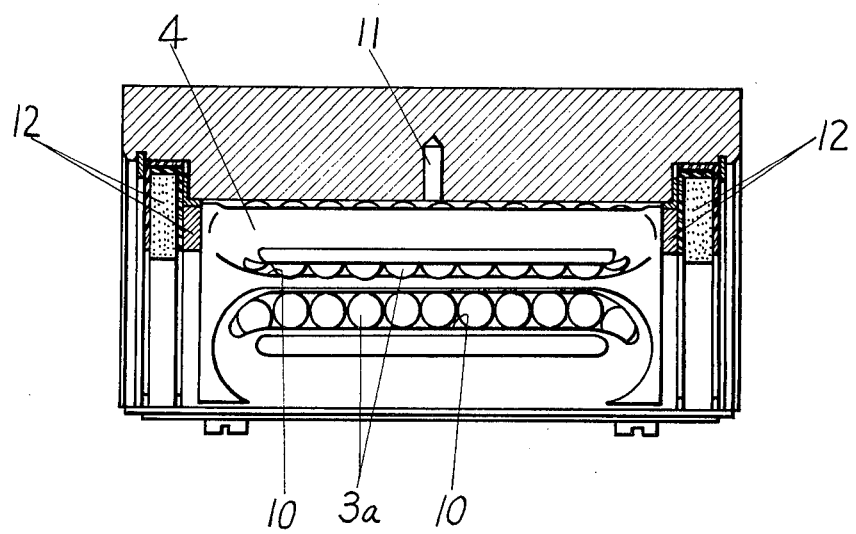
FIG. 3 is a longitudinal sectional view of the slide saddle member taken along the line A—A of FIG. 2 without the bar.

Referring to FIGS. 1 through 3, there is shown an embodiment of an improved slide way bearing according to the present invention. The slide way bearing comprises an elongated bar 1, a slide saddle member 2a, plural balls 3a, . . . , 3b, . . . , and a ball retainer 4. The elongated bar 1 is provided with two oposite sides each having a pair of circumferentially spaced apart cylindrical raceway grooves 5, . . . for loaded balls 3a, . . . arranged on respective arcuate surfaces or shoulder portion, thereby forming a track shaft part. The slide saddle member 2a has a circularly cylindrical recess with a bottom opening for receiving the elongated bar 1 therein, so as to form both thick outer sleeve part 6. The slide saddle member 2a is further machined on the inside surface of its cylindrical recess to form parallel grooves 7a, 7a, 7b, 7b and 7b which extend substantially the entire length the slide saddle member 2a to form eight raceways for loaded balls 3a, . . . and non-loaded balls 3b, . . . in cooperaton with the ball retainer 4. The elongated bar 1 is longitudinally provided with two grooves 8 on respective sides thereof located below the shoulder portion in order to form stop recesses for corresponding bottom edges of the outer sleeve part 6. Thereby, below the two grooves 8, there is formed a bed part.

The ball retainer 4 comprises a pair of identical components each having a pair of curved slot openings 10 which are served to form the raceway for loaded balls 3a, . . . in cooperation with the groove 7a respectively. The loaded balls 3a, . . . are carried in the raceways formed between the cylindrical raceway grooves 5 of the bar 1 and the grooves 7a of the slide saddle member 2a, and the non-loaded balls 3b, . . . are carried in the raceways formed between the ball retainer 4 and the grooves 7b, . . . The slide saddle member 2a is further provided with a lubrication hole 11 and sealing members 12.

Accordingly, the slide way bearing according to this embodiment is capable of bearing a heavy load imposed on the slide saddle member 2a, since the slide saddle member 2a is formed to the thick outer sleeve itself and it therefore is avoidable to deform the outer sleeve part 6. The slide way bearing is also capable of effecting a very high degree of sliding movements. This is because that the slide way bearing consists of a fewer components than a conventional slide way bearing, and it is possible to minimize the total of certain errors in each component.

Figure 4:
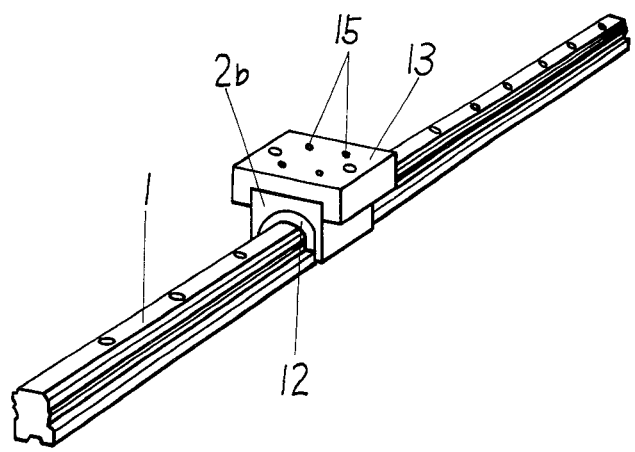
FIG. 4 is a perspective view of another embodiment of a slide way bearing according to the present invention.
Figure 5:
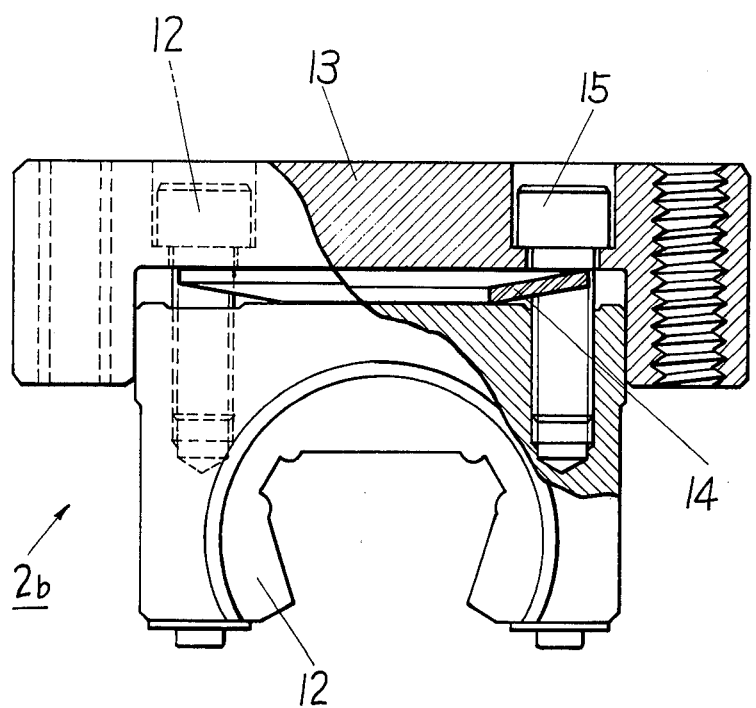
FIG. 5 is a partially cutaway view of the slide saddle member of FIG. 4 without the bar.

Referring to FIGS. 4 and 5, there is shown another embodiment of the slide way bearing according to the present invention. The slide saddle member 2b of this embodiment is provided with a cradle 13 on the saddle part thereof, including a velleville spring 14 between the saddle part and the cradle 13. The horizontal and/or height positioning of the cradle 13 with respect to the upper surface of the saddle part is effected by adjusting four clamp bolts 15, . . . Accordingly, the slide way bearing according to this embodimemt has a merit in that it is possible to adjust the upper surface of the cradle 13 horizontally, even if the mounting surface for the bar 1 is not surely horizontal, or, even if the upper surface of the slide saddle part is not surely parallel with respect to the bottom surface of the bar 1. In addition, the velleville spring 14 is served to absorb and relieve an impact load on the cradle 13, thereby preventing damage to the ball bearing assembly of the slide way bearing according to this embodiment.

Referring to FIG. 6, there is shown an typical application of slide way bearing according to the present invention to the ram driving mechanism. The ram member 16 is closely and surely supported in a column 17 by two type of the slide way bearing which are described above as the embodiments.

Referring to FIG. 7, there is shown another typical application of the slide way bearing according to the present invention a large slide rest. The slide rest 18 is mounted on two elongated bars 1 each having three slide saddle members 2b. Each slide saddle member 2b is evenly supported thereon with the load imposed on the slide rest 18, evenly distributed even if a mounting surface 19 for two bars 1 is not level as shown in FIG. 7. This is because that each slide saddle member 2b is able to expand and contract by means of the velleville spring 14.

What is claimed is:

1. A slideway bearing comprising in combination an elongated bar having a track shaft part and a bed part, a slide saddle member being formed by integrating an outer sleeve part of a ball bearing assembly with a saddle part, said sleeve part and track shaft part having complementary grooves formed therein to define a bearing raceway, ball bearings disposed in said raceway and a ball retainer for maintaining said ball bearings in said raceway.

2. A slideway bearing as claimed in claim 1, and including a cradle mounted on said saddle part, and a velleville spring disposed between said saddle part and said cradle.

3. A slide assembly comprising a slide track and slide saddle slidably mounted on said track, said track having a bed part and an integrally formed longitudinally extending raceway groove formed therein, and said slide saddle having an integrally formed curvilinear surface, a plurality of circumferentially spaced grooves formed in said curvilinear surface to define a bearing retainer, a plurality of bearings disposed in bearing relationship between the receiving grooves of said slide track and the grooves of said saddle, and a bearing retainer for spacing said bearings between said grooves.

4. The invention as defined in claim 3, and including a cradle connected to said saddle, and a spring means disposed between said saddle and said cradle for absorbing any impact load imposed on said cradle.

5. The invention as defined in claim 4, and including means for adjusting the spring loading between said cradle and said saddle.

6. The invention as defined in claim 3, wherein said bearings include a plurality of load bearings disposed between said receiving groove and saddle grooves, and a plurality of non load bearings disposed between said bearing retainer and other of said saddle grooves.

7. The invention as defined in claim 3, and including a lubricating channel formed in said saddle for lubricating said bearings.

8. A slide assembly comprising a bar for having opposed raceway grooves extending longitudinally of said slide bar, and a bed portion formed on an integral part of said slide bar, a slide saddle having an integrally formed curvilinear surface for receiving said bar, said curvilinear surface having a series of spaced grooves formed therein, certain of said saddle grooves being disposed opposite said raceway groove to define complementary bearing races, a plurality of loaded ball bearings disposed in said bearing races, retainer means for maintaining said ball bearing in said bearing races, and said retainer means having a bearing race disposed opposite the other of said saddle grooves, and a non load ball bearing disposed in the raceway defined by said retainer bearing race and said other groove of said saddle.

9. The invention as defined in claim 8, including a cradle mounted in said saddle, a spring disposed between said saddle and said cradle and means for adjusting the loading of said spring.

* * * * *